(12) United States Patent
Connelly et al.

(10) Patent No.: US 10,427,778 B2
(45) Date of Patent: Oct. 1, 2019

(54) HEAT SHIELD ASSEMBLY AND METHOD

(71) Applicant: The Boeing Company, Chicago, IL (US)

(72) Inventors: Thomas J. Connelly, Bellevue, WA (US); Linda M. Li, Seattle, WA (US)

(73) Assignee: The Boeing Company, Chicago, IL (US)

( * ) Notice: Subject to any disclaimer, the term of this patent is extended or adjusted under 35 U.S.C. 154(b) by 419 days.

(21) Appl. No.: 15/068,924

(22) Filed: Mar. 14, 2016

(65) Prior Publication Data

US 2017/0259906 A1    Sep. 14, 2017

(51) Int. Cl.
| | | |
|---|---|---|
| *B64C 3/36* | (2006.01) | |
| *B64D 29/02* | (2006.01) | |
| *B64C 1/12* | (2006.01) | |
| *B64C 1/40* | (2006.01) | |
| *B64D 27/26* | (2006.01) | |

(52) U.S. Cl.
CPC ............. *B64C 3/36* (2013.01); *B64C 1/12* (2013.01); *B64C 1/40* (2013.01); *B64D 29/02* (2013.01); *B64D 2027/262* (2013.01)

(58) Field of Classification Search
CPC .... B64C 3/36; B64C 1/12; B64C 1/40; B64C 1/068; B64D 29/02; B64D 29/06; B64D 2027/262; B64D 27/26; B64D 27/18; B64F 5/10; B21D 53/00; B64G 1/58
See application file for complete search history.

(56) References Cited

U.S. PATENT DOCUMENTS

| | | | | |
|---|---|---|---|---|
| 3,029,910 | A * | 4/1962 | Kirk | B64C 1/12 |
| | | | | 428/593 |
| 4,804,571 | A | 2/1989 | Jouffreau | |
| 5,242,523 | A * | 9/1993 | Willden | B29C 70/44 |
| | | | | 156/285 |
| 5,893,534 | A * | 4/1999 | Watanabe | B64C 1/064 |
| | | | | 244/119 |
| 5,906,097 | A * | 5/1999 | Hebert | B64C 23/00 |
| | | | | 244/53 R |
| 5,996,730 | A | 12/1999 | Pirchl | |
| 7,533,794 | B2 | 5/2009 | Comley et al. | |
| 7,850,058 | B2 | 12/2010 | Connelly et al. | |
| 8,245,971 | B2 * | 8/2012 | Makela | B64C 3/187 |
| | | | | 244/123.1 |

(Continued)

FOREIGN PATENT DOCUMENTS

| | | |
|---|---|---|
| CA | 2 414 160 | 6/2004 |
| DE | 198 49 366 | 4/2000 |
| WO | 2014/135948 | 9/2014 |

OTHER PUBLICATIONS

European Patent Office, "Communication pursuant to Article 94(3) EPC," App. No. 16 205 228.6 (dated Jul. 20, 2018).

(Continued)

*Primary Examiner* — Medhat Badawi
*Assistant Examiner* — Vicente Rodriguez
(74) *Attorney, Agent, or Firm* — Walters & Wasylyna LLC

(57) ABSTRACT

A heat shield assembly including a skin panel and a stiffener including a base portion and a bead portion protruding from the base portion, wherein the base portion is connected to the skin panel to define a bead volume between the bead portion and the skin panel.

20 Claims, 10 Drawing Sheets

(56) References Cited

U.S. PATENT DOCUMENTS

| | | | |
|---|---|---|---|
| 8,800,928 B2* | 8/2014 | Roming | B64C 1/061 |
| | | | 244/131 |
| 8,844,796 B1 | 9/2014 | Slattery | |
| 2006/0038064 A1 | 2/2006 | Mandet et al. | |
| 2007/0102494 A1 | 5/2007 | Connelly et al. | |
| 2009/0029139 A1 | 1/2009 | Schweiggart et al. | |
| 2009/0098321 A1* | 4/2009 | Zielinski | B64D 33/04 |
| | | | 428/34.6 |
| 2009/0188747 A1 | 7/2009 | Smatloch et al. | |
| 2012/0305708 A1* | 12/2012 | Robinson | B64C 1/12 |
| | | | 244/129.5 |
| 2015/0344140 A1* | 12/2015 | Peyruseigt | B64D 27/26 |
| | | | 244/54 |

OTHER PUBLICATIONS

European Patent Office, Extended European Search Report, EP 16 20 5228 (dated Jun. 9, 2017).

* cited by examiner

HEAT SHIELD ASSEMBLY AND METHOD

FIELD

This application relates to heat shields, such as heat shields on aircraft, and, more particularly, to stiffening of heat shields.

BACKGROUND

An externally mounted aircraft engine is typically attached to the associated aircraft by a pylon. As one example, the pylon may couple the engine to a wing of the aircraft (e.g., the engine may be suspended below the wing by way of the pylon). As another example, the pylon may couple the engine directly to the fuselage of the aircraft (e.g., the pylon may extend between the engine and the side of the fuselage proximate the rear of the fuselage). For aerodynamic purposes, the pylon is typically housed within a fairing.

Due to proximity with the aircraft engine, particularly with the hot exhaust gases emanating from the aircraft engine, a pylon fairing typically includes a heat shield. For example, the aft pylon fairing on a commercial aircraft can include a heat shield as a subcomponent thereof. A typical heat shield includes skin panels attached to frame members to define an internal volume/compartments. The internal volume/compartments of the heat shield may be filled with a thermal insulation material.

The skin panels of a heat shield are formed from various heat-resistant materials, such as aerospace-grade titanium alloys. Nonetheless, the skin panels of a heat shield may be susceptible to buckling when heated, particular on larger aircraft where the distance between adjacent frame members is greater.

Accordingly, those skilled in the art continue with research and development efforts in the field of aircraft heat shields.

SUMMARY

In one embodiment, the disclosed heat shield assembly may include a skin panel and a stiffener including a base portion and a bead portion protruding from the base portion, wherein the base portion is connected to the skin panel to define a bead volume between the bead portion and the skin panel.

In one embodiment, the disclosed method for stiffening a skin panel of a heat shield assembly may include the steps of (1) forming a blank into a stiffener including a base portion and a bead portion protruding from the base portion and (2) connecting the base portion to the skin panel.

Other embodiments of the disclosed heat shield assembly and method will become apparent from the following detailed description, the accompanying drawings and the appended claims.

DETAILED DESCRIPTION

Figure 1:
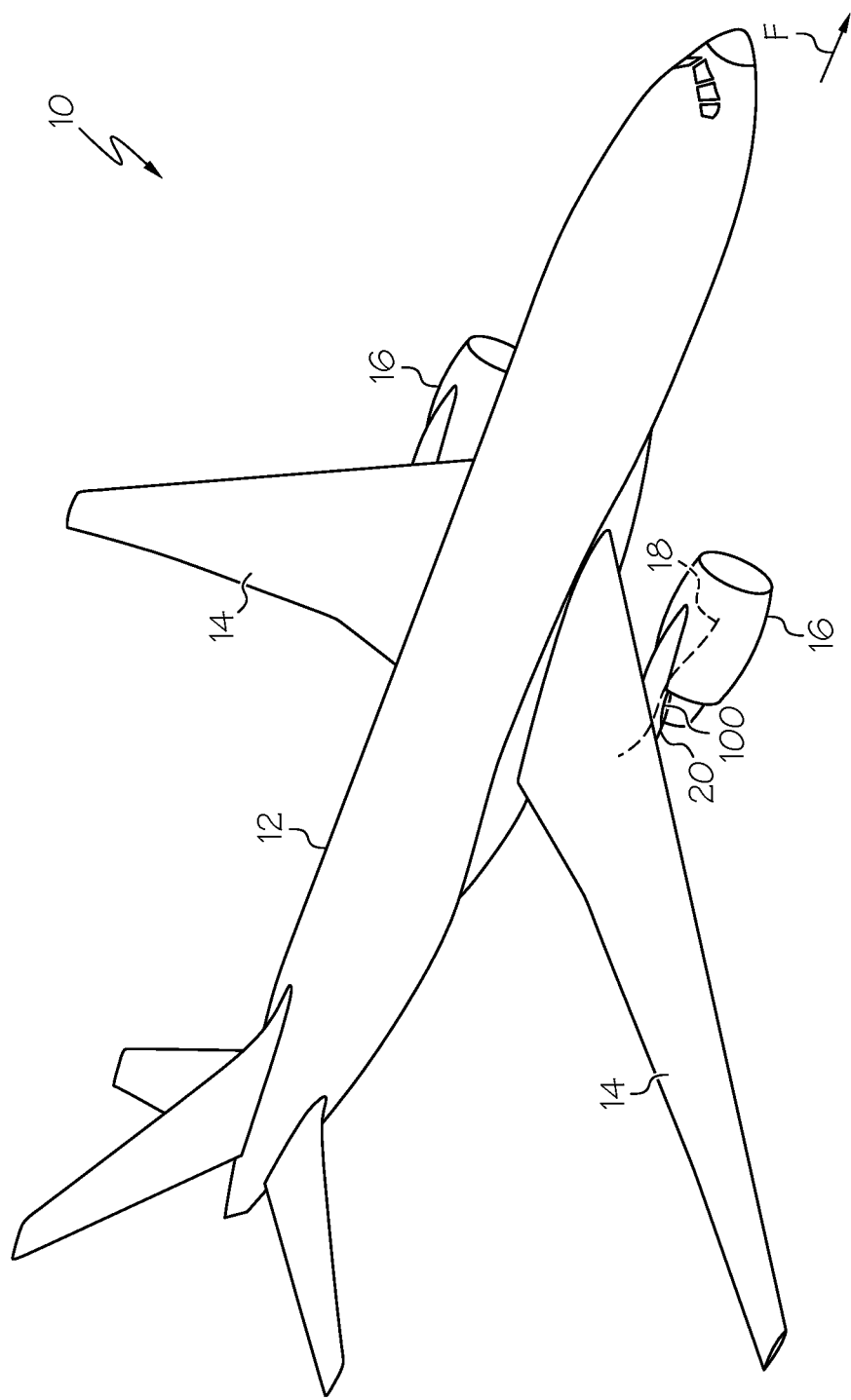
FIG. 1 is a schematic perspective view of an aircraft incorporating the disclosed heat shield assembly.

The disclosed heat shield assembly 100 may be incorporated into an aircraft, such as a fixed-wing aircraft 10, as shown in FIG. 1, or a rotary-wing aircraft. Various aircraft, including commercial aircraft, personal aircraft and military aircraft, may benefit from the disclosed heat shield assembly 100 without departing from the scope of the present disclosure.

Figure 2:
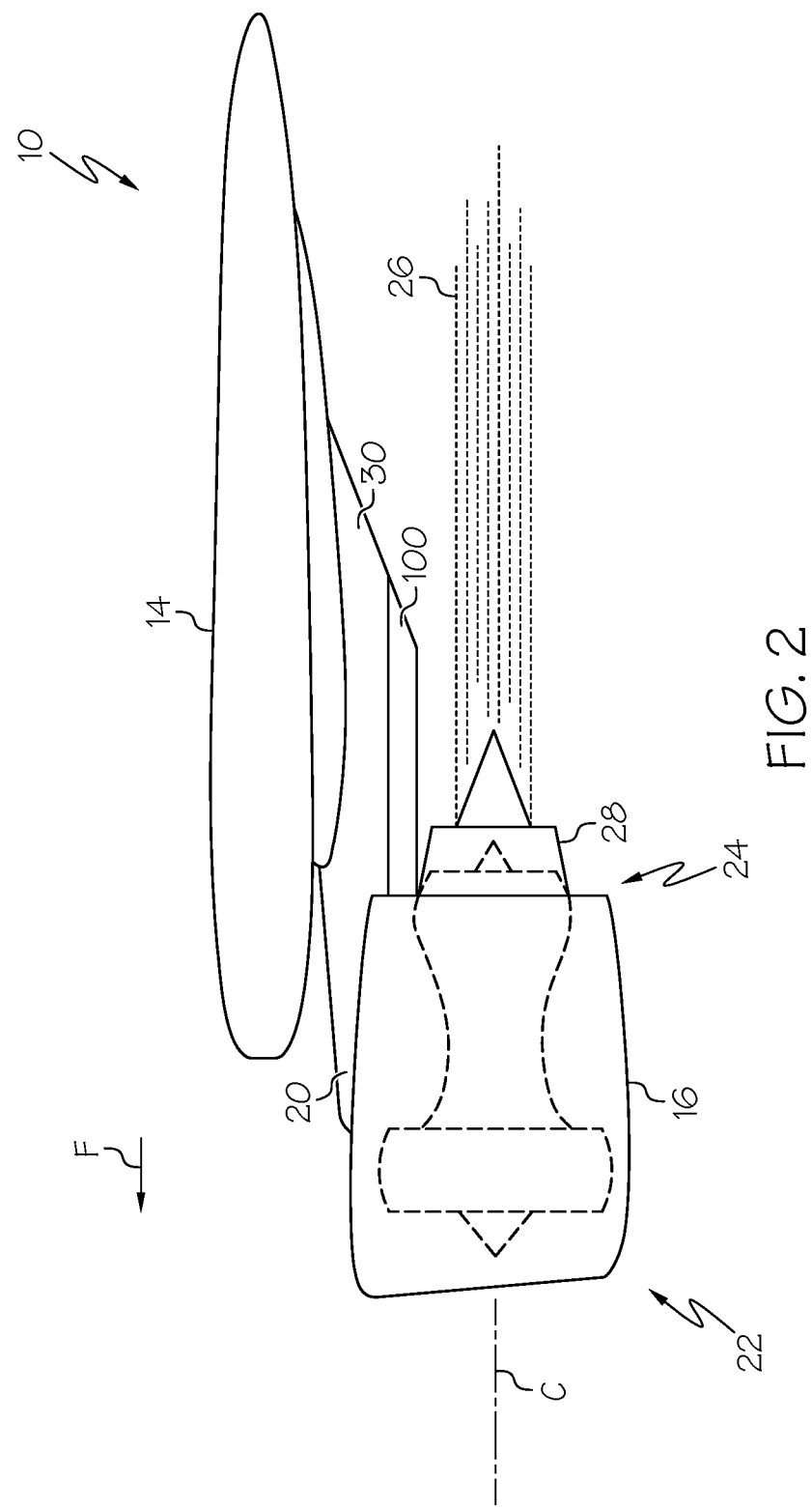
FIG. 2 is a side elevational view of a portion of the aircraft of FIG. 1, showing a pylon fairing disposed between a wing and an engine.

Referring to FIGS. 1 and 2, in one particular aspect, the disclosed aircraft 10 may include a fuselage 12, one or more wings 14 (two wings 14 are shown in FIG. 1) and one or more engines 16 (two engines 16 are shown in FIG. 1). Each wing 14 of the aircraft 10 may be fixedly connected to, and may outwardly extend from, the fuselage 12. Each engine 16 may be connected to (e.g., suspended below) an associated wing 14 by way of a pylon 18, which is shown schematically in FIG. 1 as a broken line. The pylon 18 (a structural member) may be enclosed within a pylon fairing 20 (an aerodynamic member). The disclosed heat shield assembly 100 may be associated with (e.g., connected to/integral with) the pylon fairing 20, which may be (or may include) an aft pylon fairing.

As shown in FIG. 2, each engine 16 of the aircraft 10 may be a jet engine, such as a high bypass ratio turbofan engine, and includes an inlet side 22 and an outlet side 24 longitudinally opposed from the inlet side 22. Therefore, each engine 16 of the aircraft 10 outputs an exhaust jet 26 that propels the aircraft 10 in the forward direction (arrow F). The disclosed heat shield assembly 100 may be positioned proximate the outlet side 24 of the engine 16, such as proximate an exhaust nozzle 28, such that the heat shield assembly 100 is disposed between the exhaust jet 26 and the bulk 30 of the pylon fairing 20.

Figure 3:
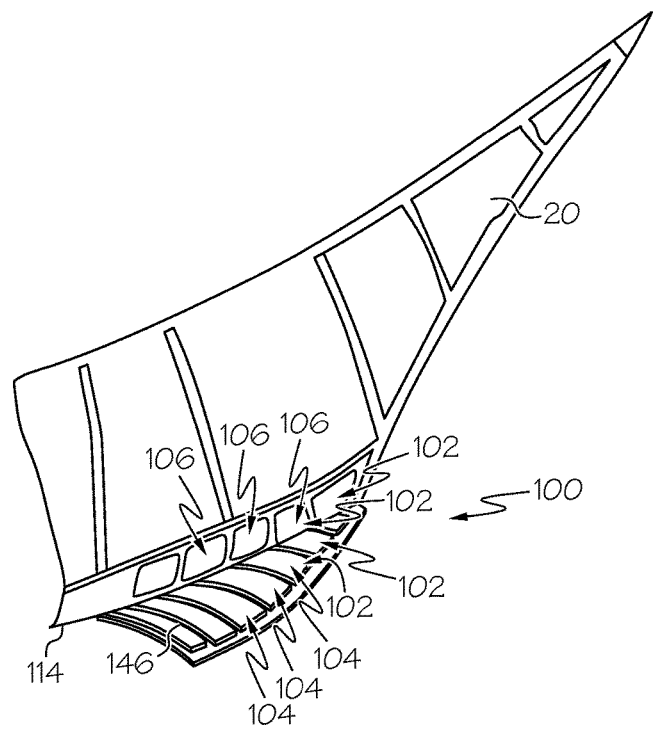
FIG. 3 is a rear perspective view of a portion of the pylon fairing of FIG. 2.
Figure 4:
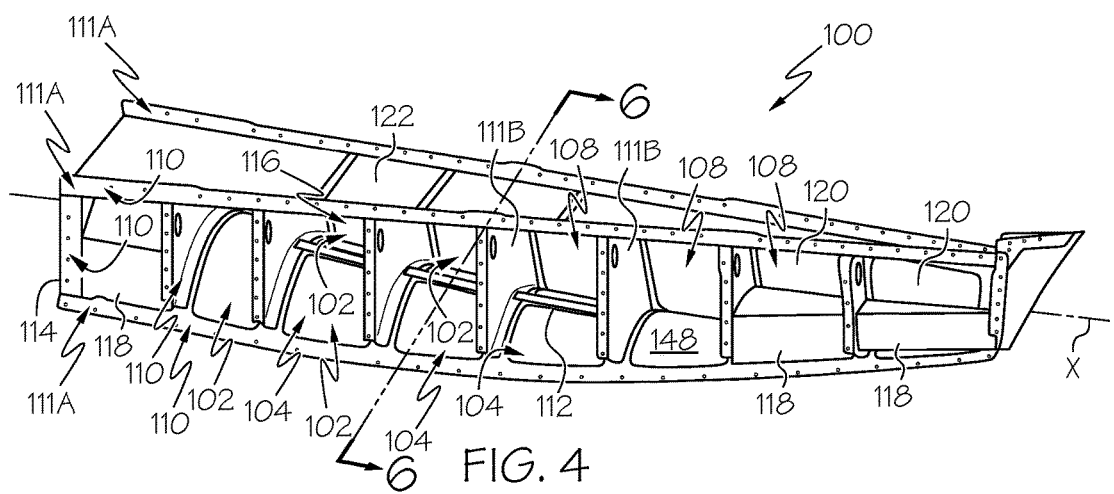
FIG. 4 is a side perspective view of a heat shield assembly of the pylon fairing of FIG. 3, shown with a side skin panel removed to expose underlying structure.

Referring to FIGS. 3 and 4, the disclosed heat shield assembly 100 includes one or more skin panels 102 and one or more stiffeners 112. The heat shield assembly 100 may further include one or more frame members 110. In the illustrated embodiment, the heat shield assembly 100 may specifically include as the skin panels 102 a base skin panel 104 and two side skin panels 106 (FIG. 3), 108 (FIG. 4). In the illustrated embodiment, the heat shield assembly 100 may specifically include as the one or more frame members 110 one or more longitudinally extending frame members 111A (FIG. 4) and one or more transverse frame members 111B (FIG. 4). The base skin panel 104 and the side skin panels 106, 108 may be placed over and connected to the frame members 110 to define a three-dimensional body 114 having an internal volume 116 (FIG. 4). Connection between the skin panels 102 and the frame members 110 may be effected using various techniques, such as by welding and/or with mechanical fasteners (e.g., rivets, nuts/bolts, etc.).

A thermal insulation material 118 (FIG. 4) may optionally be positioned in the internal volume 116 of the body 114 of the heat shield assembly 100. Various compositions (e.g., ceramics, fiberglass, etc.) may be used as the thermal insulation material 118, and the thermal insulation material 118 may be provided in various physical forms (e.g., foams, monoliths, bulk material, sheets, blankets, etc.), without departing from the scope of the present disclosure. As one specific, non-limiting example, the thermal insulation material 118 may be (or may include) aluminum oxide fibers, such as SAFFIL® aluminum oxide fibers commercially available from Saffil Ltd. of Cheshire, United Kingdom The frame members 110 may be spaced along a primary longitudinal axis X (FIG. 4) of the heat shield assembly 100, which may be generally parallel with the centerline C (FIG. 2) of the associated engine 16 (FIG. 2). Therefore, the frame members 110 may divide the internal volume 116 of the body 114 into a plurality of compartments 120 (eight distinct compartments 120 are shown in FIG. 4). One or more compartments 120 (e.g., each compartment 120) may contain thermal insulation material 118, even though four compartments 120 are shown in FIG. 4 containing thermal insulation material 118.

A cover 122 (FIG. 4) may optionally be positioned over the body 114 of the heat shield assembly 100 to enclose the internal volume 116. The cover 122 may be connected to the skin panels 102 and/or the frame members 110 using various techniques, such as by welding and/or with mechanical fasteners (e.g., rivets, nuts/bolts, etc.). Functionally, the cover 122 of the heat shield assembly 100 may contain the thermal insulation material 118 within the internal volume 116 of the body 114, while inhibiting the unintended introduction of foreign matter (e.g., oil, grease, dirt, debris, etc.) into the internal volume 116 of the body 114.

Because of the proximity to the exhaust jet 26 (FIG. 2) and the high temperature associated therewith, the base skin panel 104, the side skin panels 106, 108 and/or the frame members 110 of the disclosed heat shield assembly 100 may be formed from a material (or combination of materials) that is tolerant to relatively high temperatures. In one expression, the base skin panel 104, the side skin panels 106, 108 and/or the frame members 110 may be formed from a metallic material, such as a titanium alloy. As one specific, non-limiting example, the base skin panel 104, the side skin panels 106, 108 and the frame members 110 may be formed from Ti-6242 (Ti-6Al-2Sn-4Zr-2Mo) or a similar titanium alloy. In another expression, the base skin panel 104, the side skin panels 106, 108 and/or the frame members 110 may be formed from a composite material, such as a ceramic composite.

As shown in FIG. 4, the stiffener 112 may be separate from, but connected to, one or more of the skin panels 102 (shown connected to the base skin panel 104) to provide structural reinforcement to the skin panel 102 and, thus, serves a stiffening function. Therefore, when the heat shield assembly 100 is heated to a relatively high temperature, such as due to exposure to the exhaust jet 26 of engine 16, as shown in FIG. 2, the stiffened skin panel 102 may be less likely to buckle.

Figure 5A:
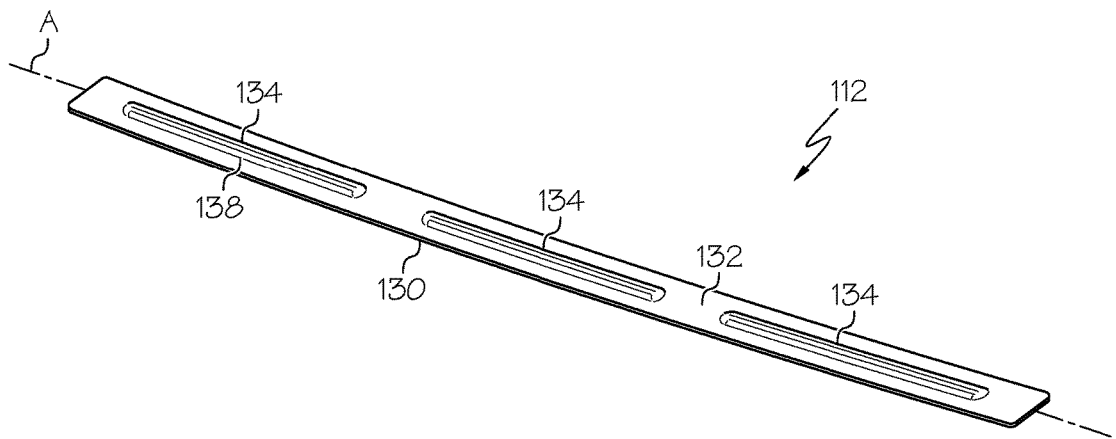
FIG. 5A is a perspective view of the stiffener of the heat shield assembly of FIG. 4.
Figure 5B:
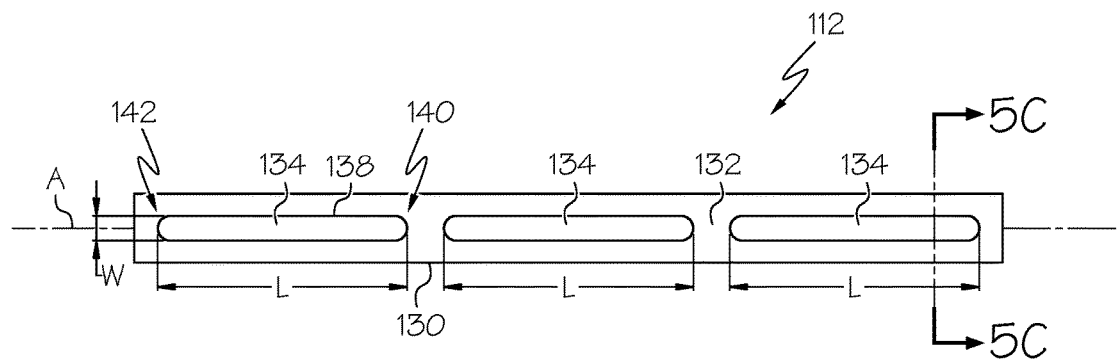
FIG. 5B is a top plan view of the stiffener of FIG. 5A.
Figure 5C:
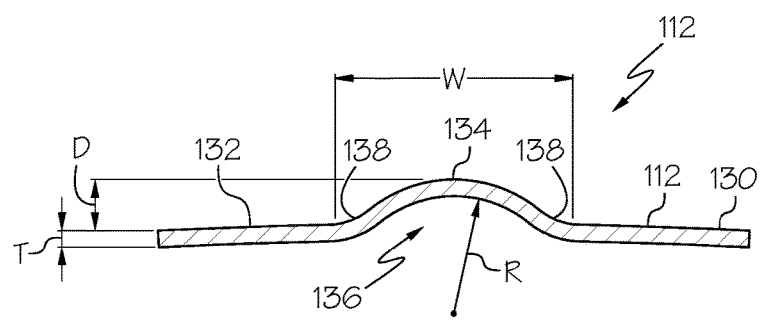
FIG. 5C is a cross-sectional view of the stiffener of FIG. 5B.

Referring to FIGS. 5A-5C, the stiffener 112 of the heat shield assembly 100 may include a monolithic body 130 that defines a base portion 132 and at least one bead portion 134 (three bead portions 134 are shown in FIGS. 5A and 5B). Each bead portion 134 protrudes outward a distance D (FIG. 5C) from the base portion 132 to define a bead volume 136 (FIG. 5C) between the bead portion 134 and the subjacent base portion 132. A fillet 138 may extend about the bead portion 134 to provide a smooth transition from the bead portion 134 to the surrounding base portion 132.

The protruding distance D (FIG. 5C) of the bead portion 134 of the stiffener 112 may be dictated by the size of the bead portion 134, such as the width W (FIG. 5C) of the bead portion 134 (transverse to the longitudinal axis A (FIG. 5B) of the bead portion 134). To provide the stiffener 112 with a low profile, the protruding distance D of the bead portion 134 may be less than or equal to the width W of the bead portion 134. In one expression, the protruding distance D of the bead portion 134 may range from about 5 percent to about 95 percent of the width W of the bead portion 134. In another expression, the protruding distance D of the bead portion 134 may range from about 10 percent to about 80 percent of the width W of the bead portion 134. In yet another expression, the protruding distance D of the bead portion 134 may range from about 20 percent to about 50 percent of the width W of the bead portion 134.

As best shown in FIG. 5C, in one particular construction, the bead portion 134 may have a generally continuous curvature. For example, the bead portion 134 may have a semi-circular profile in cross-section (FIG. 5C), as dictated by a radius R of the bead portion 134. The radius R of the bead portion 134 can be selected based on the cross-sectional thickness T of the stiffener 112 and the overall size of the stiffener 112, among other possible factors. Other cross-sectional profiles of the bead portion 134, such as arcuate or semi-elliptical, are also contemplated.

Referring to FIG. 5B, each bead portion 134 may be elongated along a longitudinal axis A. In the illustrated embodiment, each of the three bead portions 134 may be coaxially aligned, but spaced apart, along a single longitudinal axis A. However, non-aligned configurations are contemplated and described herein. Therefore, each bead portion 134 has a length L. The length L of the bead portion 134 can be selected based on the radius R (FIG. 5C) of the bead portion 134 and the overall size of the stiffener 112, among other possible factors.

The length L (FIG. 5B) of the bead portion 134 may be expressed as a function of the width W (FIG. 5C) of the bead portion 134, and vice versa. In one expression, the length L of the bead portion 134 may be at least 5 times the width W of the bead portion 134. In another expression, the length L of the bead portion 134 may be at least 10 times the width W of the bead portion 134. In another expression, the length L of the bead portion 134 may be at least 50 times the width W of the bead portion 134. In yet another expression, the length L of the bead portion 134 may be at least 100 times the width W of the bead portion 134.

As best shown in FIG. 5B, each bead portion 134 may be elongated along the longitudinal axis A from a first end portion 140 to a second end portion 142. The first and second end portions 140, 142 of the bead portion 134 may be hemispherical in plan view, thereby eliminating corners and providing a smooth and continuous transition from the bead portion 134 to the base portion 132.

The stiffener 112 of the disclosed heat shield assembly 100 may be formed from a material (or combination of materials) tolerant to relatively high temperatures. The material used to form the stiffener 112 may be the same as, similar or different from the material used to form one or more of the base skin panel 104, the side skin panels 106, 108 and the frame members 110. In one expression, the stiffener 112 may be formed from a metallic material, such as a titanium alloy. As one specific, non-limiting example, the stiffener 112 may be formed from Ti-6242 (Ti-6Al-2Sn-4Zr-2Mo) or a similar titanium alloy. In another expression, the stiffener 112 may be formed from a composite material, such as a ceramic composite.

As shown in FIGS. 4 and 6, the stiffener 112 is connected to a skin panel 102 of the heat shield assembly 100, such as to the base skin panel 104 of the heat shield assembly 100. The base skin panel 104 includes an exterior surface 146 (FIGS. 3 and 6) and an interior surface 148 (FIGS. 4 and 6). The stiffener 112 may be connected to the interior surface 148 of the base skin panel 104.

Connection between the stiffener 112 and the interior surface 148 of the base skin panel 104 may be made by way of the base portion 132 of the body 130 of the stiffener 112. Specifically, the base portion 132 of the stiffener 112 may act as a flange that facilitates connecting the stiffener 112 to the base skin panel 104. Therefore, when the base portion 132 is properly connected to the base skin panel 104, the bead portion 134 of the body 130 of the stiffener 112 protrudes outward from the base skin panel 104 and the base skin panel 104 encloses, at least partially, the bead volume 136.

Figure 6A:
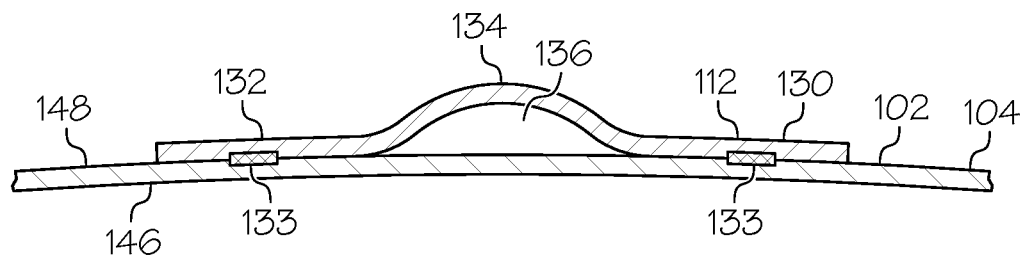
FIG. 6A is a cross-sectional view of a portion of the heat shield assembly of FIG. 4.
Figure 6B:
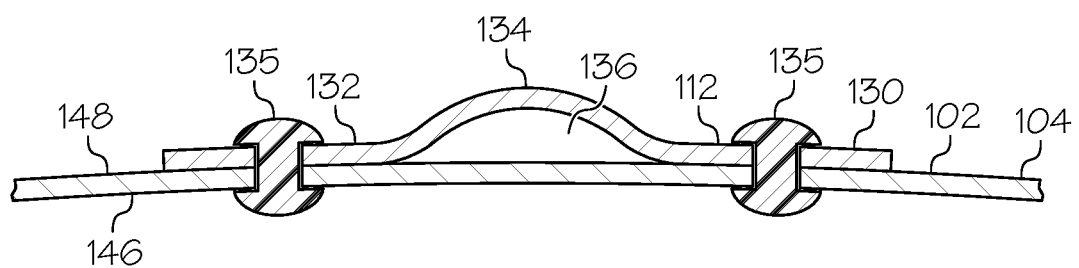
FIG. 6B depicts one variation to the portion of the heat shield assembly shown in FIG. 6A.

Various techniques may be used to effect a connection between the base portion 132 of the stiffener 112 and the base skin panel 104. As one non-limiting example, the base portion 132 of the stiffener 112 may be connected to the base skin panel 104 by thermal joints 133, such as by welding, brazing or soldering, as shown in FIG. 6A. As another non-limiting example, mechanical fasteners, such as rivets, nuts/bolts, screws and the like, may be used to connect the base portion 132 of the stiffener 112 to the base skin panel 104, as shown in FIG. 6B.

Without being limited to any particular theory, it is believed that connecting a stiffener 112 having a bead portion 134 directly to a skin panel 102 of a heat shield assembly 100, particularly to the base skin panel 104 of a heat shield assembly 100, may advantageously stiffen the skin panel 102, thereby may reduce (if not eliminate) the occurrence of buckling when the heat shield assembly 100 is heated, such as by the exhaust jet 26 of an engine 16, as shown in FIG. 2. Significantly, the low profile of the bead portion 134 of the disclosed stiffener 112 may facilitate introducing the stiffener 112 to a heat shield assembly 100 with little or no modification to the other components (e.g., the frame members 110 and the thermal insulation material 118) of the heat shield assembly 100. Therefore, the disclosed stiffener 112 may be connected to the skin panel 102 of a heat shield assembly 100 as an original component or, alternatively, the heat shield assembly 100 may be retrofitted to include the stiffener 112.

Various techniques may be employed for forming the disclosed stiffener 112 depending on various considerations, including cost and the composition of the material being formed into the disclosed stiffener 112.

Figure 7A:
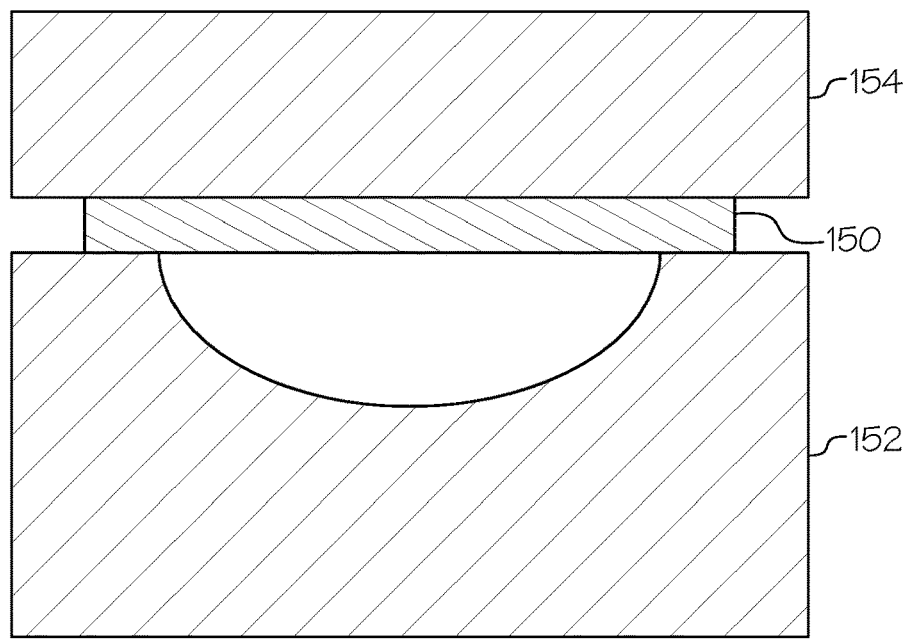
FIGS. 7A and 7B depict one example method for manufacturing a stiffener for a heat shield assembly in accordance with the present disclosure.

In one particular implementation, the disclosed stiffener 112 may be formed using a superplastic forming process. However, other suitable methods may be used to form the stiffener 112. As shown in FIG. 7A, a blank 150 of material is positioned on a die 152. The blank 150 may be formed from a metal or metal alloy, such as a titanium alloy (e.g., Ti-6242), though use of non-metallic materials is also contemplated. Prior to placement of the blank 150 on the die 152, the blank 150 is cut (e.g., die-cut) to the desired silhouette (e.g., an elongated rectangular strip). A cover 154 is positioned over the blank 150, thereby sandwiching the blank 150 between the die 152 and the cover 154.

Figure 7B:
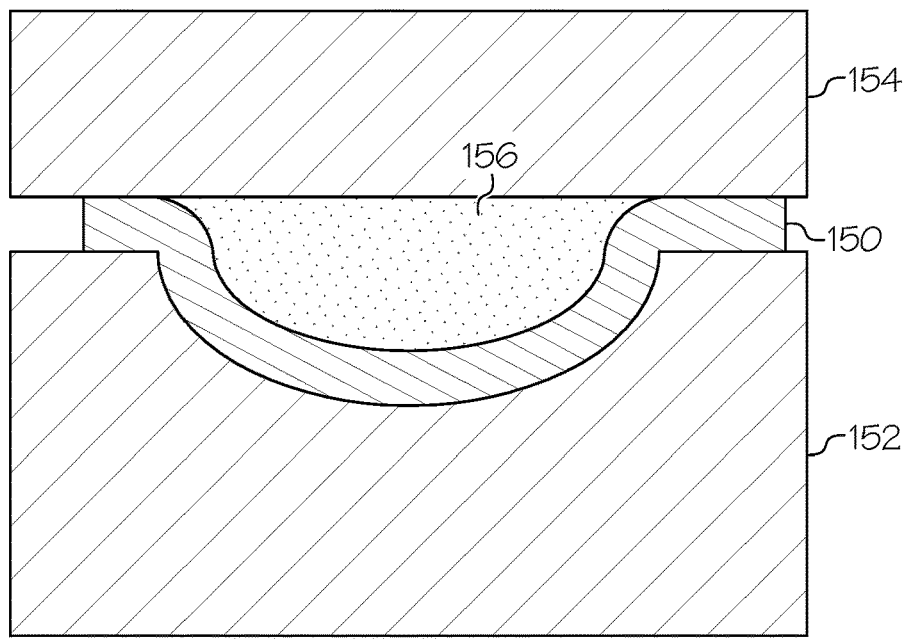

To effect the desired superplastic formation, the blank 150 (as well as the die 152 and the cover 154) is heated to a temperature at which the material of the blank 150 becomes superplastic. For example, when the blank 150 is formed from a titanium alloy, superplasticity of the blank 150 may be achieved by heating the blank 150 to a temperature ranging from about 1,450° F. to about 1,850° F. Once at the desired temperature, the blank 150 is formed against the die 152, such as by injecting a gas 156 (e.g., an inert gas/gas mixture) between the blank 150 and the cover 154 to urge the superplastic blank 150 against the die 152, as shown in FIG. 7B. In one variation, rather than injecting a gas 156, a vacuum may be drawn through the die 152 to urge the superplastic blank 150 against the die 152. In another variation, rather than injecting a gas 156 or drawing a vacuum, the superplastic blank 150 may be shaped against the die 152 under the force of gravity.

Figure 8:
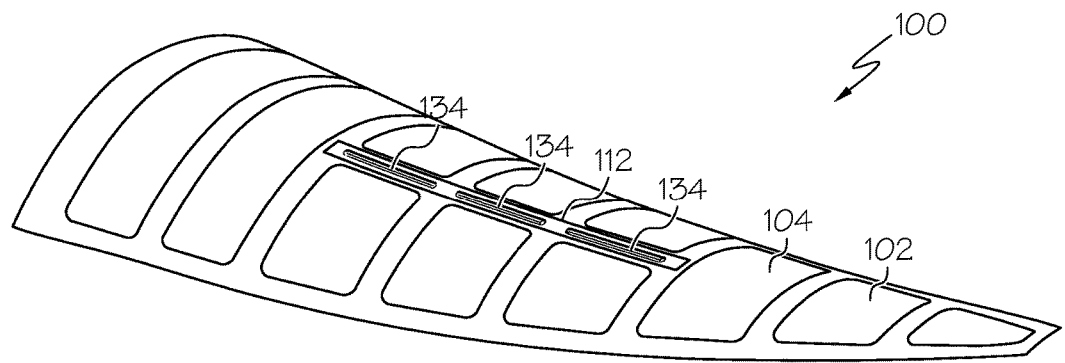
FIG. 8 is a perspective view of a portion of the heat shield assembly of FIG. 4 in accordance with one embodiment of the present disclosure.

Referring to FIGS. 4 and 8, in one particular embodiment, the disclosed stiffener 112 may be connected to the base skin panel 104 such that the bead portions 134 of the stiffener 112 are oriented in substantial alignment with the primary longitudinal axis X (FIG. 4) of the heat shield assembly 100 (e.g., the longitudinal axis A (FIG. 5A) of the bead portions 134 of the stiffener 112 may be parallel with the primary longitudinal axis X of the heat shield assembly 100). Furthermore, since only one stiffener 112 is shown in FIGS. 4 and 8, the stiffener 112 may be generally centered relative to the base skin panel 104. However, variations in the location of the stiffener 112 vis-à-vis the base skin panel 104, as well as variations in the orientation of the stiffener 112 vis-à-vis the primary longitudinal axis X of the heat shield assembly 100, will not result in a departure from the scope of the present disclosure.

Figure 9:
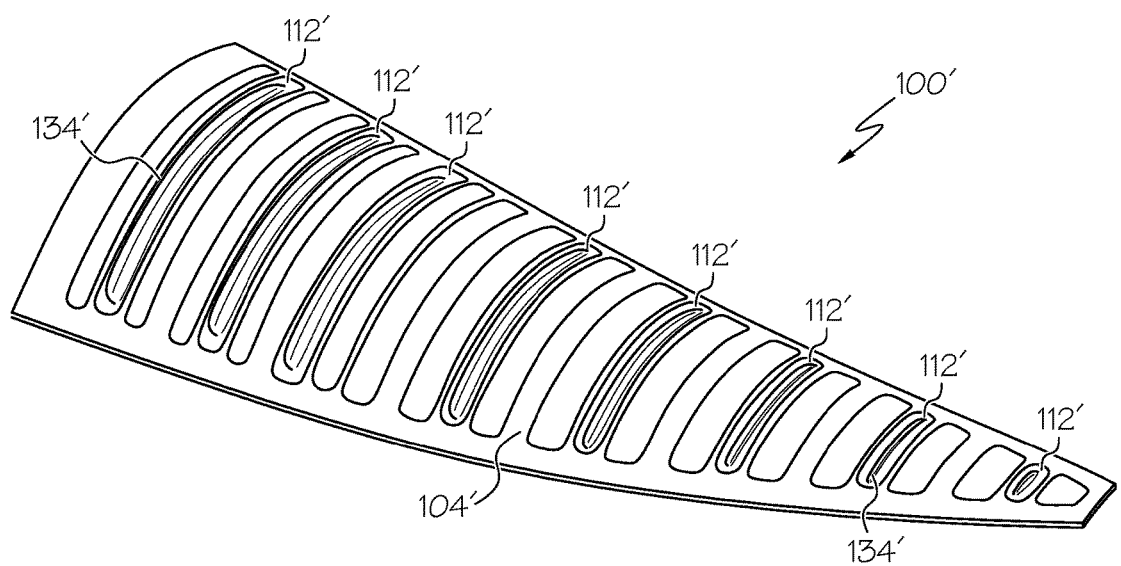
FIG. 9 is a perspective view of a portion of a heat shield assembly in accordance with a first alternative embodiment.

Referring to FIG. 9, in one alternative embodiment, plural stiffeners 112' are connected to the base skin panel 104' of the disclosed heat shield assembly 100'. Each stiffener 112' (or some stiffeners 112') may be separate from, and not directly connected to, the other stiffeners 112'. While eight stiffeners 112' are specifically shown in FIG. 9, few than eight stiffeners 112' (e.g., only one stiffener 112') or more than eight stiffeners 112' may be included without departing from the scope of the present disclosure. The number of stiffeners 112' included in a heat shield assembly 100' can be selected based on, among other possible factors, the overall size of each stiffener 112' and the overall size of the base skin panel 104'.

Still referring to FIG. 9, the stiffeners 112' of the heat shield assembly 100' may be connected to the base skin panel 104' such that the bead portion 134' of each stiffener 112' (or of some stiffeners 112') is transverse (e.g., lateral) with respect to the primary longitudinal axis X (FIG. 4) of the heat shield assembly 100'. Various alternative orientations (e.g., not aligned and not lateral) vis-à-vis the primary longitudinal axis X of the heat shield assembly 100' may be used without resulting in a departure from the scope of the present disclosure.

Figure 10:
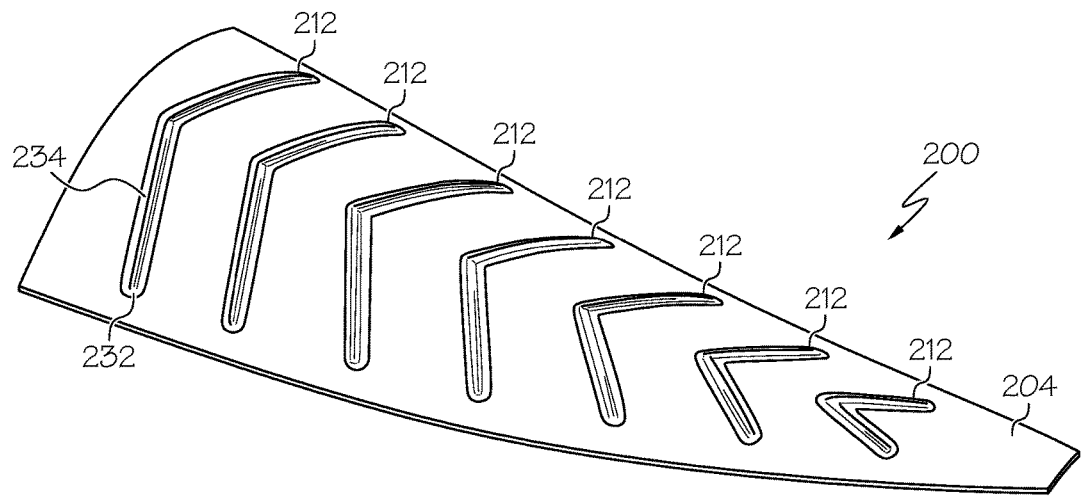
FIG. 10 is a perspective view of a portion of a heat shield assembly in accordance with a second alternative embodiment.

Referring to FIG. 10, in another alternative embodiment, plural stiffeners 212 are connected to the base skin panel 204 of the disclosed heat shield assembly 200, though using only one stiffener 212 is also contemplated. Each stiffener 212 is substantially similar to stiffeners 112 and 112', except for the shape of the bead portion 234. More specifically, each stiffener 212 (or some stiffeners 212) includes a bead portion 234 that is elongated, but not linear (like stiffeners 112 and 112'). In the specific embodiment illustrated in FIG. 10, the bead portion 234 may form a chevron pattern on the stiffener 212. The base portion 232 surrounding the bead portion 234 may closely correspond to the bead portion 234, thereby giving the stiffener 212 a chevron profile in plan view.

Figure 11:
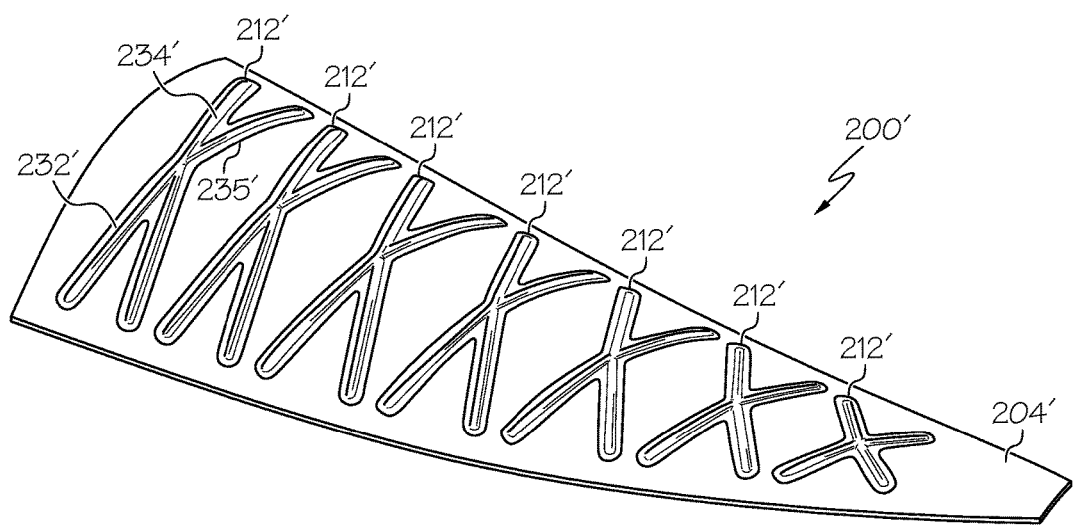
FIG. 11 is a perspective view of a portion of a heat shield assembly in accordance with a third alternative embodiment.

Referring to FIG. 11, in another alternative embodiment, plural stiffeners 212' are connected to the base skin panel 204' of the disclosed heat shield assembly 200', though using only one stiffener 212' is also contemplated. Stiffeners 212' are substantially similar to stiffeners 112 and 112', except for the shape of the bead portions 234', 235'. More specifically, each stiffener 212' (or some stiffeners 212') includes a first bead portion 234' and a second bead portion 235', and the second bead portion 235' intersects the first bead portion 234' at an intermediate area between the ends of the bead portions 234', 235'. Therefore, the bead portions 234', 235' may form a cruciform (e.g. X) on the stiffener 212'. The base portion 232' surrounding the bead portion 234' may closely correspond to the bead portions 234', 235', thereby giving the stiffener 212' an X-shape in plan view.

Figure 12:
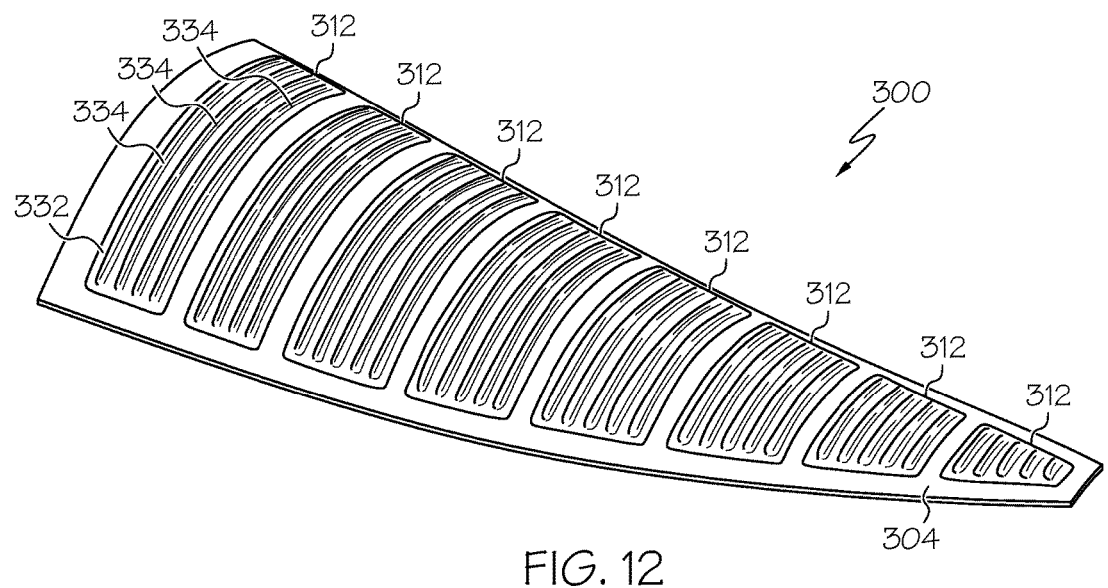
FIG. 12 is a perspective view of a portion of a heat shield assembly in accordance with a fourth alternative embodiment.

Referring to FIG. 12, in another alternative embodiment, plural stiffeners 312 are connected to the base skin panel 304 of the disclosed heat shield assembly 300, though using only one stiffener 312 is also contemplated. Stiffeners 312 are substantially similar to stiffeners 112 and 112', except for the shape of the bead portions 334. More specifically, each stiffener 312 (or some stiffeners 312) includes plural bead portions 334 protruding from the base portion 332. Each bead portion 334 of a stiffener 312 may be separate from and generally parallel with the other bead portions 334 of the stiffener 312 (not intersecting), and the bead portions 334 may be laterally oriented with respect to the primary longitudinal axis X (FIG. 4) of the heat shield assembly 300. Various alternative (e.g., non-lateral) orientations vis-à-vis the primary longitudinal axis X of the heat shield assembly 300 may be used without resulting in a departure from the scope of the present disclosure.

Figure 13:
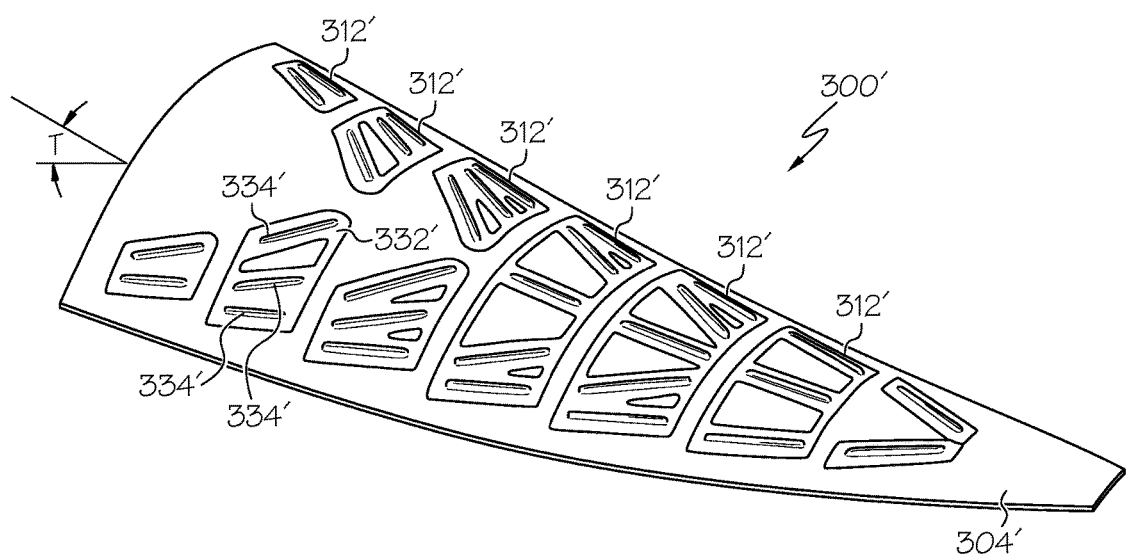
FIG. 13 is a perspective view of a portion of a heat shield assembly in accordance with a fifth alternative embodiment.

Referring to FIG. 13, in yet another alternative embodiment, plural stiffeners 312' are connected to the base skin panel 304' of the disclosed heat shield assembly 300', though using only one stiffener 312' is also contemplated. Stiffeners 312' are substantially similar to stiffeners 112 and 112', except for the shape of the bead portions 334'. More specifically, each stiffener 312' (or some stiffeners 312') includes plural bead portions 334' protruding from the base portion 332'. Each bead portion 334' of a stiffener 312' may be separate from the other bead portions 334', and may be oriented at an angle T with respect to the primary longitudinal axis X (FIG. 4) of the heat shield assembly 300. In one expression, the angle T may range from about 0 degrees to about 90 degrees. In another expression, the angle T may range from about 0 degrees to about 45 degrees. In another expression, the angle T may range from about 0 degrees to about 30 degrees. In another expression, the angle T may range from about 45 degrees to about 90 degrees. In yet another expression, the angle T may range from about 60 degrees to about 90 degrees.

The location of a stiffener, the number of stiffeners used, the number of bead portions on a given stiffener, and/or the orientation of the bead portion may be selected to optimize the stiffeners for a particular application. Various combinations and variations are possible without departing from the scope of the present disclosure.

Figure 14:
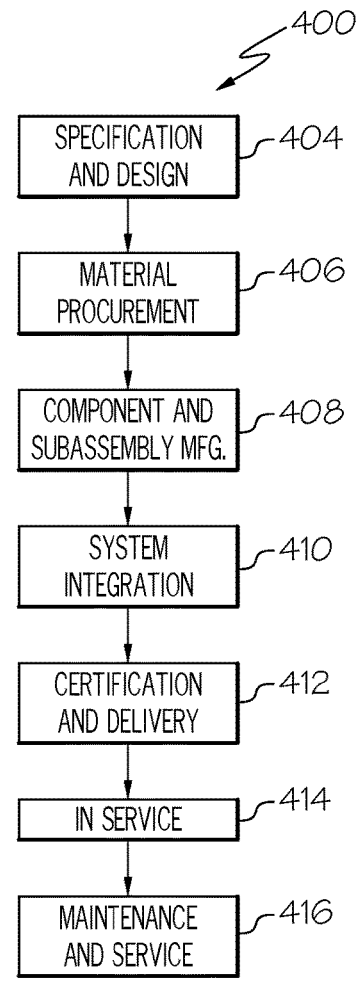
FIG. 14 is a flow diagram of an aircraft manufacturing and service methodology.
Figure 15:
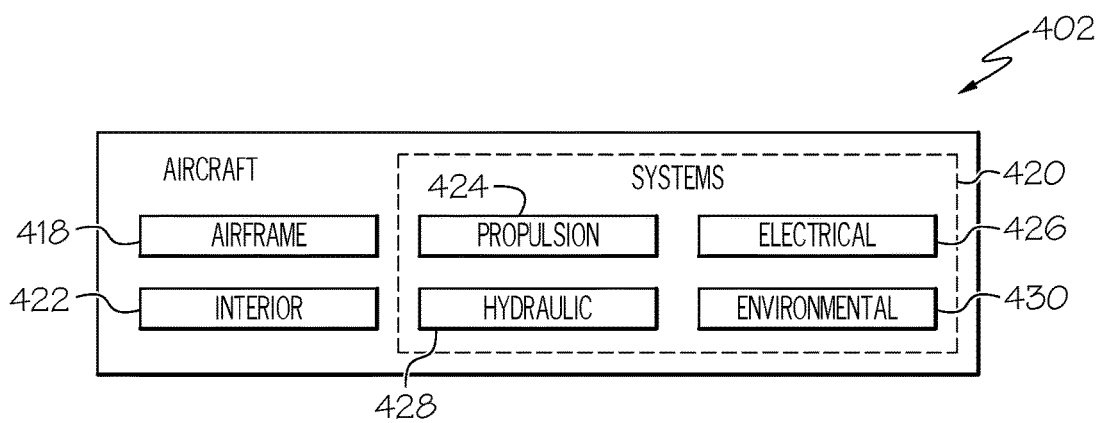
FIG. 15 is a block diagram of an aircraft.

Examples of the disclosure may be described in the context of an aircraft manufacturing and service method 400, as shown in FIG. 14, and an aircraft 402, as shown in FIG. 15. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed heat shield assembly and method may be employed during any one or more of the stages of the aircraft manufacturing and service method 400. As one example, components or subassemblies corresponding to component/subassembly manufacturing 408, system integration 410, and or maintenance and service 416 may be fabricated or manufactured using the disclosed heat shield assembly and method. As another example, the airframe 418 may be constructed using the disclosed heat shield assembly and method. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed heat shield assembly and method are described in the context of an aircraft; however, one of ordinary skill in the art will readily recognize that the disclosed heat shield assembly and method may be utilized for a variety of applications. For example, the disclosed heat shield assembly and method may be implemented in various types of vehicle including, e.g., helicopters, passenger ships, automobiles and the like.

Although various embodiments of the disclosed heat shield assembly and method have been shown and described, modifications may occur to those skilled in the art upon reading the specification. The present application includes such modifications and is limited only by the scope of the claims.

What is claimed is:

1. A heat shield assembly comprising:
 a frame comprising a plurality of frame members joined together, wherein said plurality of frame members includes a plurality of longitudinally extending frame members, each extending along a primary longitudinal axis of the heat shield assembly, and a plurality of transverse frame members, each perpendicular to the primary longitudinal axis and spaced away from each other, wherein the plurality of transverse frame members are joined to the plurality of longitudinally extending frame members;
 a skin panel directly connected to the frame; and
 a stiffener directly connected to the skin panel, said stiffener comprising a base portion and a bead portion protruding from said base portion, wherein said base portion is directly connected to said skin panel to define a bead volume between said bead portion and said skin panel, wherein said bead portion is positioned between two adjacent ones of said plurality of transverse frame members.

2. The heat shield assembly of claim 1 wherein said skin panel comprises an interior surface and an exterior surface, wherein said plurality of frame members are directly connected to said interior surface.

3. The heat shield assembly of claim 2 wherein said base portion of said stiffener is directly connected to said interior surface.

4. The heat shield assembly of claim 1 wherein said skin panel is a base skin panel, and further comprising a first side skin panel directly connected to said plurality of frame members and a second side skin panel directly connected to said plurality of frame members.

5. The heat shield assembly of claim 1 wherein said stiffener comprises a monolithic body, and wherein said monolithic body defines said base portion and said bead portion.

6. The heat shield assembly of claim 1 wherein said stiffener comprises a fillet between said base portion and said bead portion.

7. The heat shield assembly of claim 1 wherein said base portion is directly connected to said skin panel by a thermal joint.

8. The heat shield assembly of claim 1 wherein said base portion is directly connected to said skin panel by a mechanical fastener.

9. The heat shield assembly of claim 1 wherein said bead portion comprises a continuous curvature.

10. The heat shield assembly of claim 1 wherein said bead portion is elongated along a longitudinal axis.

11. The heat shield assembly of claim 10 wherein said longitudinal axis of said bead portion is substantially aligned with said primary longitudinal axis.

12. The heat shield assembly of claim 10 wherein said longitudinal axis of said bead portion is transverse with respect to said primary longitudinal axis.

13. The heat shield assembly of claim 1 wherein said stiffener further comprises a second bead portion.

14. The heat shield assembly of claim 13 wherein said second bead portion intersects said bead portion.

15. An aircraft comprising a pylon fairing, wherein said pylon fairing comprises said heat shield assembly of claim 1.

16. The heat shield assembly of claim 1 wherein said plurality of longitudinally extending frame members includes at least a first upper longitudinally extending frame member at a first side of the heat shield assembly, a second upper longitudinally extending frame member at a second side of the heat shield assembly, and a first lower longitudinally extending frame member at the first side of the heat shield assembly, wherein each transverse frame member is supported by at least the first upper longitudinally extending frame member, the second upper longitudinally extending frame member, and the first lower longitudinally extending frame member.

17. The heat shield assembly of claim 16 wherein said skin panel is a base skin panel directly connected to lower portions of each of the plurality of transverse frame members.

18. The heat shield assembly of claim 1 wherein the skin panel is formed from a metallic material.

19. The heat shield assembly of claim 1 wherein adjacent ones of the plurality of frame members are jointed together.

20. The heat shield assembly of claim 1 wherein each transverse frame member of the plurality of transverse frame members is directly joined with two of the plurality of longitudinally extending frame members.

* * * * *